(12) United States Patent
Kim et al.

(10) Patent No.: US 12,305,680 B2
(45) Date of Patent: May 20, 2025

(54) LOCKING BRACKET AND METHODS OF USING THE SAME

(71) Applicant: Kubota Corporation, Osaka (JP)

(72) Inventors: Min Sung Kim, Atlanta, GA (US); Douglas Swartz, Marietta, GA (US); Phillip Sutton, Jr., Gainesville, GA (US)

(73) Assignee: Kubota Corporation, Osaka (JP)

( * ) Notice: Subject to any disclaimer, the term of this patent is extended or adjusted under 35 U.S.C. 154(b) by 742 days.

(21) Appl. No.: 17/128,884

(22) Filed: Dec. 21, 2020

(65) Prior Publication Data

US 2022/0196056 A1 Jun. 23, 2022

(51) Int. Cl.
*F16B 17/00* (2006.01)
*A01D 34/00* (2006.01)
(Continued)

(52) U.S. Cl.
CPC .......... *F16B 17/004* (2013.01); *A01D 34/001* (2013.01); *A01D 43/077* (2013.01); *E05C 2005/005* (2013.01)

(58) Field of Classification Search
CPC ........... Y10T 292/0969; Y10T 292/096; Y10T 292/0997; Y10T 292/1022; Y10T 292/1023; Y10T 292/1024; Y10T 292/1028; F16B 17/004; A01D 34/001; A01D 43/077; E05C 1/085; E05C 1/08; E05C 1/10; E05C 1/00; E05C 1/002; E05C 1/004; E05C 1/006; E05C 1/12;
(Continued)

(56) References Cited

U.S. PATENT DOCUMENTS

| | | | | |
|---|---|---|---|---|
| 874,712 A | * | 12/1907 | Tyden | ................. E05B 65/0864 292/57 |
| 1,262,054 A | * | 4/1918 | Johnson et al. | .... E05B 65/0864 220/DIG. 26 |

(Continued)

FOREIGN PATENT DOCUMENTS

| | | | | |
|---|---|---|---|---|
| CN | 107700984 A | * | 2/2018 | ............... E05C 1/08 |
| EP | 0901952 A1 | * | 3/1999 | ......... E05B 17/2088 |

(Continued)

*Primary Examiner* — Kristina R Fulton
*Assistant Examiner* — Steven A Tullia
(74) *Attorney, Agent, or Firm* — Hovey Williams LLP; Kameron D. Kelly

(57) ABSTRACT

A locking bracket and methods of using the same are disclosed. The locking bracket includes a rigid body and a locking pin slidably and rotatably coupled to the rigid body and movable between an unlocked position and a locked position. An engagement member can enter and exit the rigid body when the locking pin is in the unlocked position but is locked to the rigid body when the locking pin is in the locked position. Optionally, the rigid body may include a guide portion that guides the engagement member to a mounting position within the rigid body. The methods include swinging an attachment component towards a main body until the engagement member engages the locking bracket coupled to the main body, removing the locking pin from the unlocked position, and locking the attachment component to the bracket by placing the locking pin in the locked position.

15 Claims, 6 Drawing Sheets

(51) Int. Cl.
*A01D 43/077* (2006.01)
*E05C 5/00* (2006.01)

(58) Field of Classification Search
CPC ........ E05C 19/00; E05C 19/003; E05C 19/08;
E05B 15/04; E05B 17/0037; E05B 17/02;
E05B 17/04; E05B 17/12; E05B 17/20;
E05B 17/60; E05B 63/20; Y10S 292/15;
Y10S 292/30; Y10S 292/46; Y10S 292/63
See application file for complete search history.

(56) References Cited

U.S. PATENT DOCUMENTS

| | | | | | |
|---|---|---|---|---|---|
| 1,348,260 | A | * | 8/1920 | Boyer | E05C 17/14 292/262 |
| 1,834,678 | A | * | 12/1931 | Bryant | E05C 17/48 292/283 |
| 1,842,697 | A | * | 1/1932 | Anderson | B60D 1/025 280/515 |
| 3,792,777 | A | * | 2/1974 | Drake | A47F 5/12 16/334 |
| 3,949,540 | A | * | 4/1976 | Christopherson | A01D 43/063 56/202 |
| 3,985,249 | A | * | 10/1976 | Aker | E02F 3/3631 172/275 |
| 4,013,311 | A | * | 3/1977 | Prezioso | E05C 19/003 292/264 |
| 4,286,810 | A | * | 9/1981 | Ehmen | E05C 17/50 292/DIG. 60 |
| 4,345,448 | A | * | 8/1982 | Solomon | E05B 67/36 70/2 |
| 4,881,362 | A | * | 11/1989 | Parker | A01D 43/077 56/16.6 |
| 4,943,096 | A | * | 7/1990 | Looper | E05C 19/08 292/213 |
| 4,977,733 | A | * | 12/1990 | Samejima | B62D 7/142 327/414 |
| 4,997,218 | A | * | 3/1991 | Culling | E05D 7/1016 292/DIG. 20 |
| 5,018,344 | A | * | 5/1991 | Samejima | A01D 43/077 56/13.3 |
| 5,078,569 | A | * | 1/1992 | Cook | E02F 3/3636 414/723 |
| 5,263,810 | A | * | 11/1993 | Takekata | E02F 3/3672 403/322.3 |
| 5,536,131 | A | * | 7/1996 | Behr | B60P 1/025 296/25 |
| 6,962,210 | B1 | * | 11/2005 | Redenius | A01B 59/062 414/723 |
| 7,001,136 | B2 | * | 2/2006 | Perrin | E02F 3/3672 37/468 |
| 7,001,137 | B2 | * | 2/2006 | Perrin | A01B 59/062 37/468 |
| 7,398,987 | B2 | * | 7/2008 | Roe | B60D 1/28 280/515 |
| 8,360,460 | B1 | * | 1/2013 | Jarvis | B60D 1/02 280/515 |
| 8,690,201 | B2 | * | 4/2014 | Frazier | E05C 1/04 256/73 |
| 9,342,093 | B2 | * | 5/2016 | Villarreal | E02F 3/3631 |
| 9,840,819 | B2 | * | 12/2017 | Hopfensperger | E01H 10/007 |
| 2008/0030029 | A1 | * | 2/2008 | McGinnis | E05C 7/04 292/259 R |
| 2009/0230657 | A1 | * | 9/2009 | Miller | B60D 1/52 280/515 |
| 2011/0179720 | A1 | * | 7/2011 | Zijlstra | E05C 1/10 292/179 |
| 2011/0198866 | A1 | * | 8/2011 | Benson | E05B 67/383 292/150 |
| 2014/0159384 | A1 | * | 6/2014 | Frazier | E05C 1/08 292/137 |
| 2015/0251505 | A1 | * | 9/2015 | Rodda | B60D 1/025 280/515 |
| 2017/0020106 | A1 | * | 1/2017 | Dalzell | A01K 1/0613 |

FOREIGN PATENT DOCUMENTS

| | | | | |
|---|---|---|---|---|
| EP | 1096084 A1 | * | 5/2001 | ........ E05B 65/0864 |
| EP | 1306489 A1 | * | 5/2003 | ........... E02F 3/3631 |
| GB | 612612 A | * | 11/1948 | ............... E05C 1/10 |
| GB | 2501772 A | * | 11/2013 | ........... A47L 11/283 |
| KR | 20220000692 U | * | 3/2022 | ............ E05C 17/20 |
| WO | WO-2018057816 A1 | * | 3/2018 | ........... A01B 59/006 |

* cited by examiner

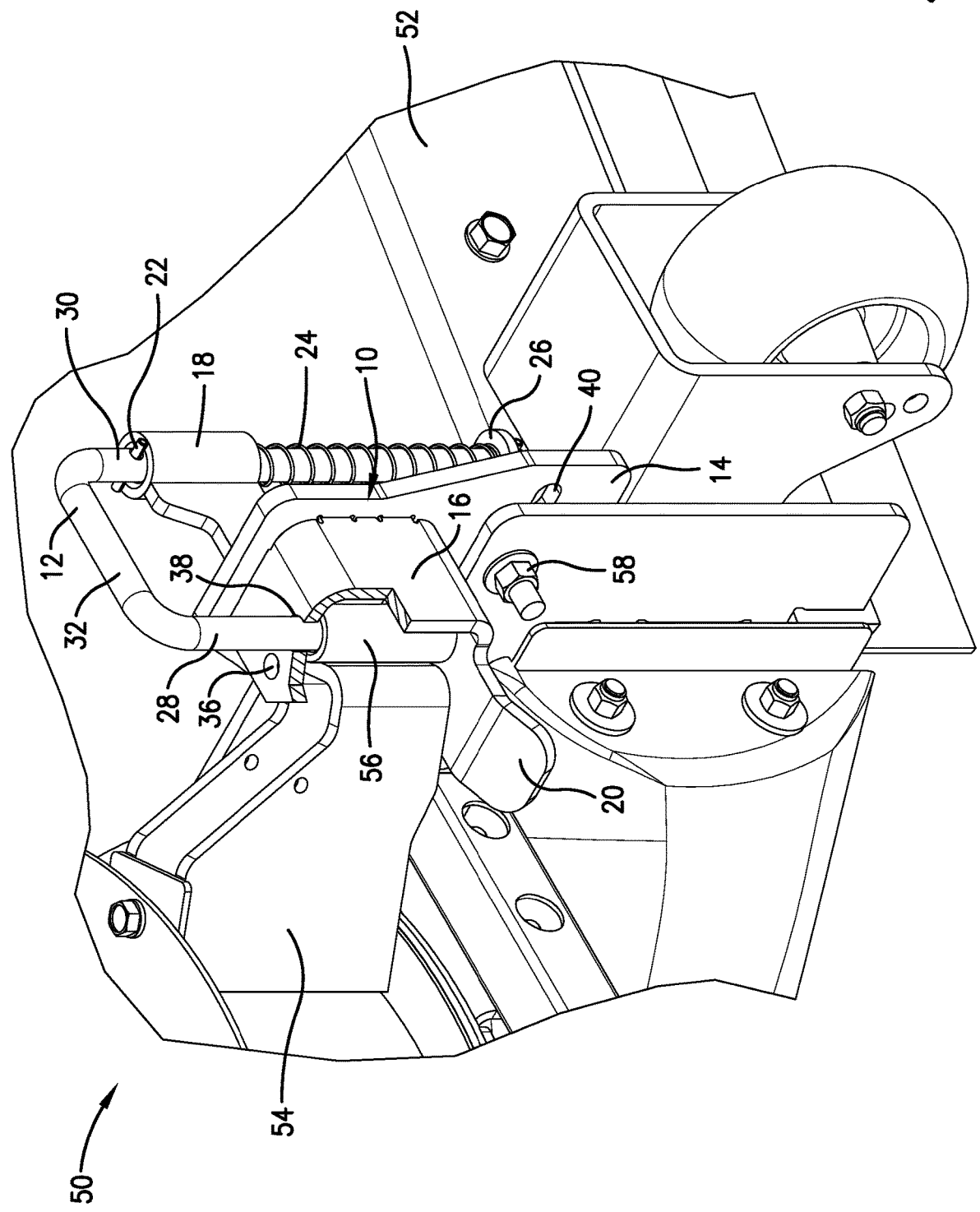

LOCKING BRACKET AND METHODS OF USING THE SAME

BACKGROUND OF THE INVENTION

Many machines such as mowers, tractors, ATVs, farm equipment, and other industrial equipment include various attachments that can be removed and replaced according to the specific application for which the machine is being utilized. For example, with respect to mowers, a blower kit, which blows grass clippings into a hopper, can be attached to or removed from a mower deck depending on whether the grass being cut is to be collected or else mulched and returned to the ground, respectively.

However, particularly for large commercial mowers, it is difficult and time-consuming to attach and detach the blower kit from the mower deck. This is because the blower kit is heavy and cumbersome and thus it is difficult for one person to lift the kit into place and properly align the mounting hardware. Other farm implements and attachments similarly are bulky and difficult to handle. Moreover, often the blower kit or other attachment is secured in place by a T-shaped pin and clip or similar mechanism. But it is difficult to insert and remove the pin when attaching and detaching the blower kit or other attachment due to the possibility of misalignment.

There thus remains a need for an improved attachment interface between an attachment component and main body of a piece of equipment such as a blower kit and a mower deck or similar that provides easy attachment and detachment of the component in order to quickly switch out the component, service the component in the field, or otherwise access an interior of the component. There further remains a need for an improved locking pin that provides for improved engagement and removal of the pin from a locked position as the attachment component is attached to or detached from the main body such as a mower deck or similar.

BRIEF SUMMARY OF THE INVENTION

Some embodiments of the invention are directed to a locking bracket. The locking bracket includes a rigid body and a locking pin slidably and rotatably coupled to the rigid body and movable between an unlocked position and a locked position. The rigid body is configured to removably receive an engagement member. The locking pin is configured to permit the engagement member to enter and exit the rigid body when the locking pin is in the unlocked position and to lock the engagement member in the rigid body when the locking pin is in the locked position.

Other embodiments of the invention are directed to another locking bracket. The locking bracket includes a rigid body including a guide portion, and a locking member slidably and rotatably coupled to the rigid body. The guide portion is configured to guide an engagement member to a mounting position within the rigid body. And the locking member is configured to lock the engagement member in the rigid body when the engagement member is in the mounting position.

Still other embodiments of the invention are directed to a method of attaching an attachment component to a main body. The method includes swinging the attachment component towards the main body until an engagement member of the attachment component engages a bracket coupled to the main body. The method further includes removing a locking pin of the bracket from an unlocked position and locking the attachment component to the bracket by placing the locking pin in a locked position.

These and other features will be discussed in more detail below in connection with the accompanying drawings.

BRIEF DESCRIPTION OF THE DRAWINGS

The present invention is described in detail below with reference to the attached drawing figures, wherein:

FIG. 6 is the close-up view shown in FIG. 5 with the locking pin in the locked position and the blower attachment in the locked state and with the mounting channel shown in a partial sectional view in order to better illustrate certain features of the locking bracket.

DETAILED DESCRIPTION OF THE INVENTION

Generally, aspects of the invention are directed to an improved locking bracket for securing an attachment component to a main body of a piece of machinery or the like such as, in one non-limiting example, for securing a blower kit to a mower deck of a mower, and methods of using such a locking bracket. At a high level, the locking bracket includes a U-shaped pin that is easily movable between a locked position and a storage position or other unlocked position without special tools or the like. The locking bracket may also include a guide portion such as a guide tab or other portion that guides an engagement member such as a mounting boss of the attachment component to a mounting location to assist with proper alignment of the component during attachment. In some embodiments, the U-shaped pin is self-contained within the locking bracket in order to retain the pin within the locking bracket without requiring the use of a retention cable or similar retention component required by known mounting brackets.

Figure 1:
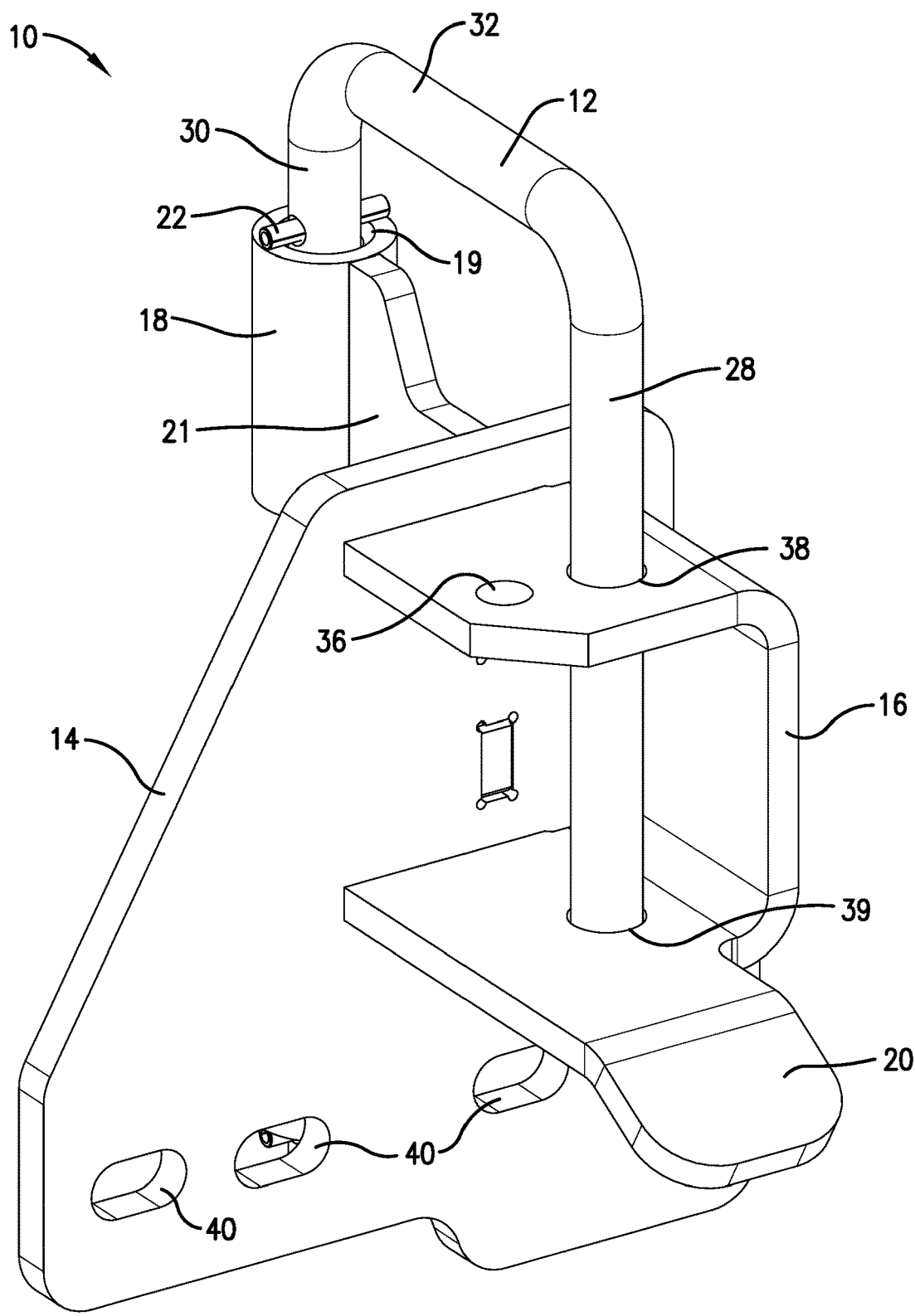
FIG. 1 is a perspective view of a locking bracket according to aspects of the invention with a locking pin thereof shown in a locked position.
Figure 2:
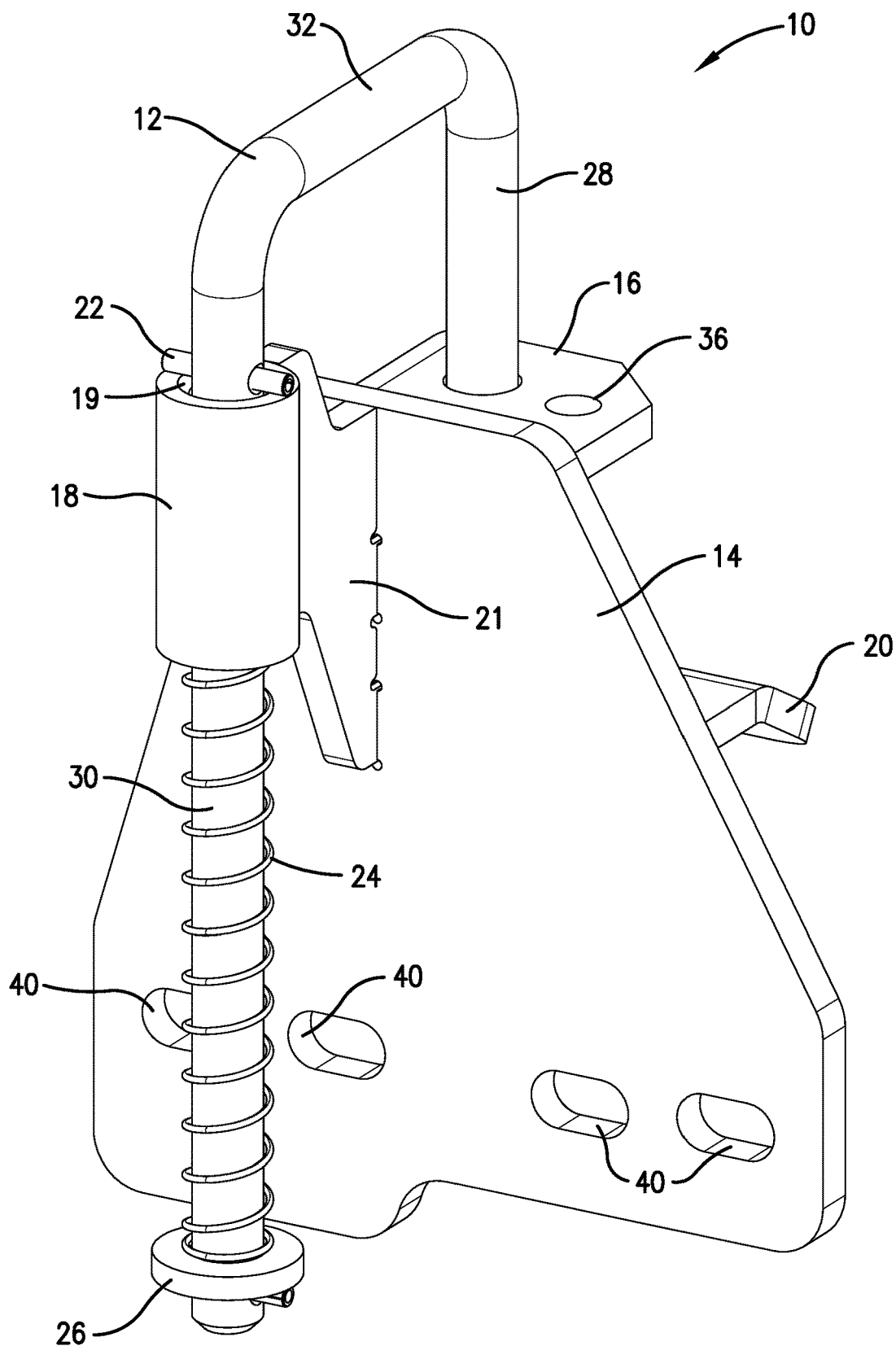
FIG. 2 is another perspective view of the locking bracket shown in FIG. 1.
Figure 3:
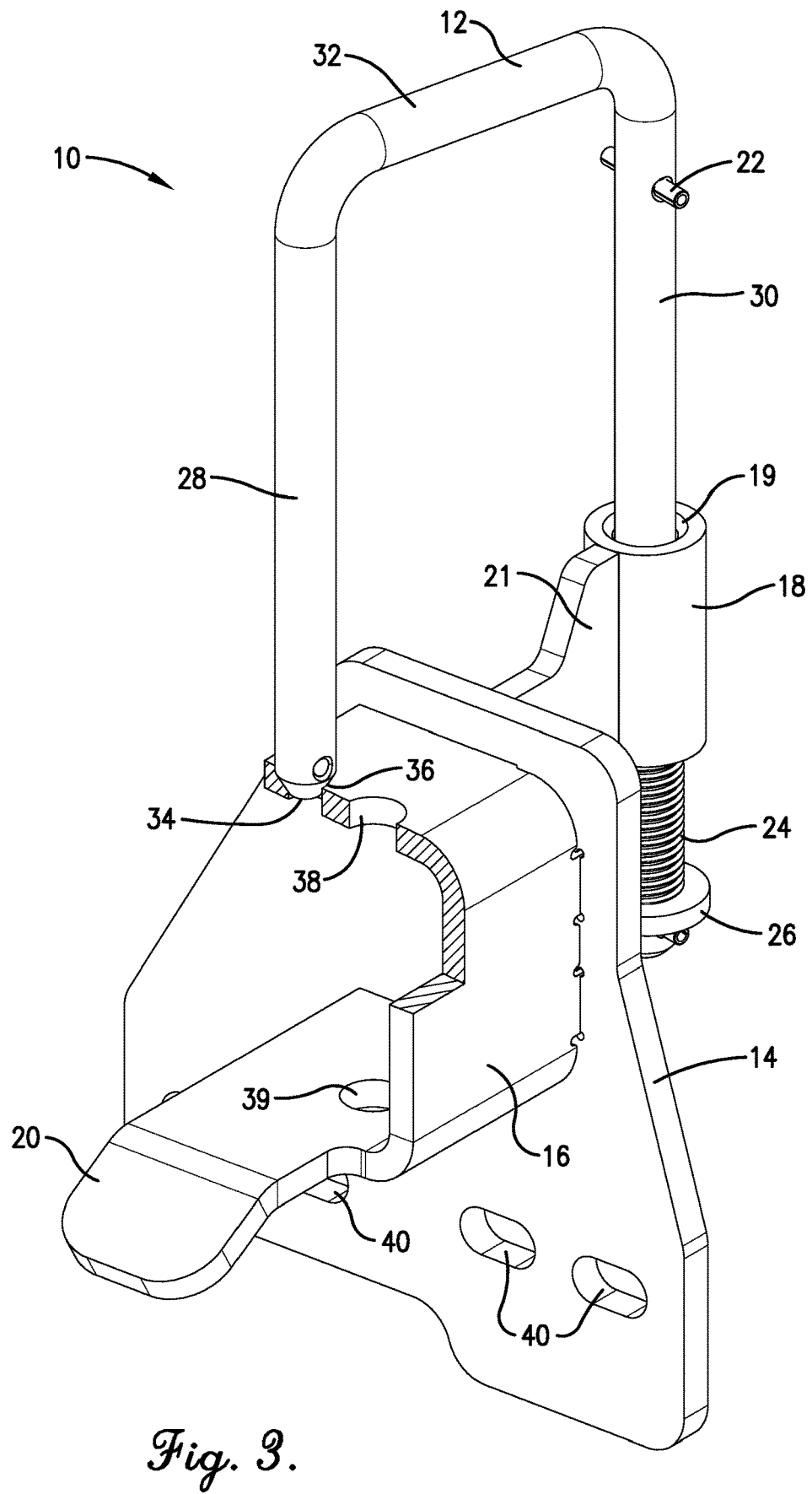
FIG. 3 is another perspective view of the locking bracket shown in FIGS. 1-2 with the locking pin shown in a storage position and with a mounting channel thereof shown in a partial sectional view in order to better illustrate certain features of the locking bracket.

This will be more readily understood with reference to the figures. First, FIGS. 1-3 show a locking bracket 10 according to an embodiment of the invention, including a locking pin 12 of the locking bracket 10 shown in a locked position (FIGS. 1-2) and a storage position (FIG. 3) as one example of an unlocked position. Although embodiments of the invention are shown and described in connection with the locking pin 12 moving between the storage position and the locked position, the invention is not so limited and in other embodiments the locking pin 12 is movable between another unlocked position (such as a position in which a first leg 28 of the locking pin 12 does not engage any portion of the channel 16) without departing from the scope of the invention. The locking bracket 10 generally includes the locking pin 12 and a rigid body comprised of a mounting plate 14 configured to be mounted to a main body of a piece of equipment or machinery such as a mower deck or similar, a channel 16 coupled (e.g., welded) to the plate 14 and configured to receive an engagement member such as a mounting boss or other member of an attachment component such as a blower kit or similar and including a guide tab 20 as one example of a guide portion configured to guide the engagement member to a mounting location with the channel 16, and a sleeve 18 coupled to the plate 14 via an intermediary flange 21, in which the locking pin 12 is slidably and rotatably mounted. Although for convenience aspects of the invention will be discussed in connection with a mower and more particularly in connection with attaching and detaching a blower kit to a mower deck, the invention is not so limited and can in other embodiments be employed at any interface of an attachment component and a main body. Some non-limiting examples include the interface of a farm implement with a tractor, the interface of a trailer tailgate and the trailer main frame, and others.

In the depicted embodiment, the locking pin 12 is a U-shaped pin including a first leg 28, a second leg 30, and a handle portion 32 extending between the first leg 28 and the second leg 30. The first leg 28 and second leg 32 extend substantially parallel to one another, and the handle portion 32 extends substantially perpendicular to the legs 28, 30 and spans the proximal ends of the two legs 28, 38. The handle portion 32 is sized and shaped to be grasped by a user and thereby lifted and rotated into a desired position (i.e., into a locked position, a storage position, or another unlocked position, as will be more fully discussed). Although the locking pin 12 is shown as a U-shaped pin, the pin can take any other shape and configuration without departing from the scope of the invention. For example, in some embodiments the locking pin 12 may include a T-shaped, O-shaped, or other-shaped extension extending from an upper end of the locking pin 12 to be grasped by a user.

As best seen in FIG. 2, the sleeve 18 is substantially tubular and includes a through hole 19 sized and configured to receive the locking pin 12, and more particularly the second leg 30 thereof, in a slidably and rotatably manner. In some embodiments, the sleeve 18 may be directly affixed by, e.g., welding or otherwise to the plate 14. In other embodiments, such as the embodiment shown, the sleeve 18 may be spaced from apart from the plate 14 via an intermediary flange 21. A biasing member 24 such as a coil spring or the like surrounds the second leg 30 of the locking pin 12 and is sandwiched between a lower face of the tubular sleeve 18 and a retainer 26 removably affixed near a distal end of the second leg 30 of the locking pin 12. Moreover, a stop 22 is provided near an upper end of the second leg 30 of the locking pin 12, which is configured to engage an upper face of the tubular sleeve 18 when the locking pin 12 is in the locked position (FIGS. 1-2).

Figure 4:
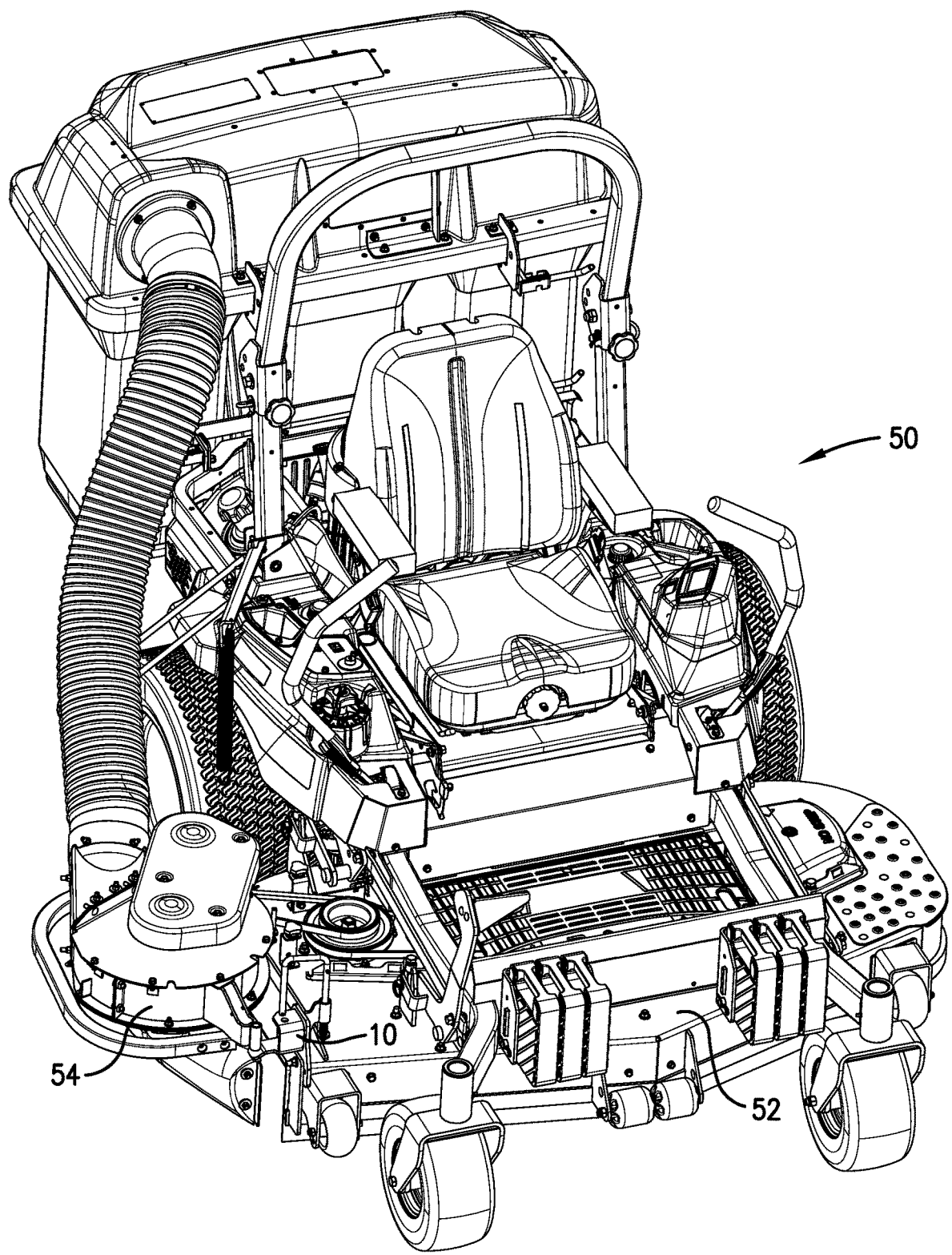
FIG. 4 is a mower with a blower attachment and including the locking bracket shown in FIGS. 1-3.

As will be discussed in connection with FIGS. 4-6, to move the locking pin 12 from the locked position to the storage position or other unlocked position, a user grasps the handle portion 32 of the pin 12 and pulls up to counteract the biasing force caused by the biasing member 24, thereby separating the stop 22 from the upper face of the sleeve 18 while compressing the biasing member 24 (FIG. 3), thus increasing the biasing force applied to the locking pin 12. The locking pin 12 is then rotated to a desired position (i.e., so that it is aligned with one of a storage hole 36 or a first locking hole 38, to be discussed) and released such that the biasing force returns the locking pin 12 to the locked position (FIGS. 1-2) or the storage position (FIG. 3) or other unlocked position. Although in the depicted embodiment the shown biasing member 24 is a coil spring, any other suitable biasing member could be employed without departing from the scope of the invention such as a torsion, compression, or other type of spring, elastomeric band, or other biasing member.

In some embodiments, the channel 16 is affixed (e.g., welded or otherwise) to an opposing face of the plate 14 than that to which the flange 21 is affixed. In that regard, the locking pin 12, which extends from the channel 16 to the sleeve 18, generally straddles the plate 14 with the first leg 28 operatively engaged with the channel 16, the second leg 30 operatively engaged with the sleeve 18, and the handle portion 32 extending over an uppermost end of the plate 14. In the depicted embodiment, the channel 16 is substantially C-shaped in cross-section, but in other embodiments the channel 16 may take any other suitable shape such as a square tube or similar without departing from the scope of the invention.

As best seen in FIGS. 1 and 3, the channel 16 includes two through holes provided in the upper face thereof: a storage hole 36 and a first locking hole 38. As best seen in FIG. 3, the storage hole 36 has a smaller diameter than the first locking hole 38. Moreover, the diameter of the storage hole 36 is smaller than the diameter of the cross-sectional area of the first leg 28 of the locking pin 12, while the diameter of the first locking hole 38 is larger than the diameter of the cross-sectional area of the first leg 28. Accordingly, the first leg 28 of locking pin 12 can slide through the first locking hole 38 (FIGS. 1 and 2) but cannot slide through the storage hole 36 (FIG. 3). Instead, when the locking pin 12 is engaged with the storage hole 36 (i.e., when the locking pin 12 is in the storage position), a tip 34 of the first leg 28 engages the storage hole 36 but the leg 28 does not otherwise extend therethrough.

In some embodiments, as shown in FIG. 3, the tip 34 may include a substantially frustoconical shape such that, when the locking pin 12 is in the storage position, the distal end of the tip 34 extends inside the storage hole 36 but the frustoconical surface of the tip 34 engages an upper opening of the storage hole 36, thereby securely holding the pin 12 in the storage position. And as should be appreciated given the benefit of this disclosure, the locking pin 12 is biased into the storage position via the biasing member 24 until an external force is applied to locking pin 12 via a user of the locking bracket 10, thus securely maintaining the locking pin 12 in the storage position or other unlocked position when not in use.

Because the locking hole 38 has a diameter larger than the cross-sectional area of the first leg 28 of the locking pin 12, the first leg 28 passes therethrough when the locking pin 12 is moved to the locked position (FIGS. 1-2). More particularly, to place the pin 12 in the locked position, a user lifts up on the locking pin 12 via the handle portion 32 thereby counteracting the biasing force of the biasing member 24 and thus unseating the tip 34 of the first leg 28 from the storage hole 36. Because the second leg 30 of the locking pin 12 is slidably and rotatably housed within the sleeve 18, the locking pin 12 is rotatable to a position in which it is aligned with the first locking hole 38. At this point, if the user releases the handle portion 32, the biasing force forces the locking pin 12 downwards, forcing the first leg 28 through the first locking hole 38 and into the locked position (FIGS. 1-2). The locking pin 12 will travel downwards to a position in which the stop 22 engages an upper surface of the tubular sleeve 18.

As best seen in FIG. 1, in some embodiments the channel 16 includes a second locking hole 39 provided in a lower surface of the channel 16. The second locking hole 39 is axially aligned with the first locking hole 38 and has the same diameter as the first locking hole 38 (i.e., the second locking hole 39 has a larger diameter than the cross-sectional area of the first leg 28) so that the first leg 28 of the locking pin 12 can pass through the second locking hole 39 when the locking pin 12 is in the locked position. In other embodiments, the second locking hole 39 may have a different diameter than the first locking hole 38. For example, the second locking hole 39 may include a diameter similar in size to the storage hole 36 such that, when the locking pin 12 is in the locked position, the tip 34 of the second leg 28 engages with the second locking hole 39 in a like manner as it engages with the storage hole 36 when the locking pin 12 is in the storage position.

The above configuration of the locking bracket 10 provides many benefits when used to secure an attachment component (such as a blower kit or the like) to a main body of a piece of machinery (such as a mower deck or the like). This will be more readily understood with reference to the remaining figures. More particularly, FIGS. 4-6 show the locking bracket 10 described above mounted to a main portion 52 (i.e., a mower deck) of a mower 50 and used to secure a mowing attachment 54 (i.e., a blower kit or similar) thereto.

The plate 14 includes a plurality of mounting holes 40 provided near a bottom edge of the plate 14 to mount the locking bracket 10 to the main body 52 such as a mower deck. More particularly, and as best seen in FIG. 5, when the locking bracket 10 is used to secure a mowing attachment 54 (such as the blower kit) to a main body 52 (such as a mower deck), the locking bracket 10 is secured to the main body 52 by extending fasteners 58 through one or more of the mounting holes 40 and through a portion of the main body 52. In this regard, the main body may include a threaded opening to receive the fasteners 58 or else may include similarly sized and shaped through holes as the mounting holes with the fasteners 58 extending through both the plate 14 and deck portion and threaded into a nut in a conventional fashion. The locking bracket 10 is mounted such that the open interior of the channel 16 is facing the mowing attachment 54 and is thus configured to receive an engagement member thereof (in the depicted embodiment, a mounting boss 56 thereof) within the interior of channel 16.

The mowing attachment 54 includes an engagement member such as the mounting boss 56 or other member configured to be removably received by the locking bracket 10. In the depicted embodiment, the mounting boss 56 is substantially tubular and more particularly is cylindrical and includes a through hole extending the entire axial length of the boss 56. In other embodiments, the mounting boss 56 can take any suitable shape without departing from the scope of the invention. For example, in some embodiments the mounting boss 56 or other engagement member may be a square tube or similar. As with the first and second locking holes 38, 39, a cross-sectional diameter of the through hole extending through the mounting boss 56 is larger than the cross-sectional diameter of the first leg 28 of the locking pin 12. Thus, the first leg 28 of the locking pin 12 can be removably received within the mounting boss 56 when the pin 12 is in the locked position (FIG. 6).

Figure 5:
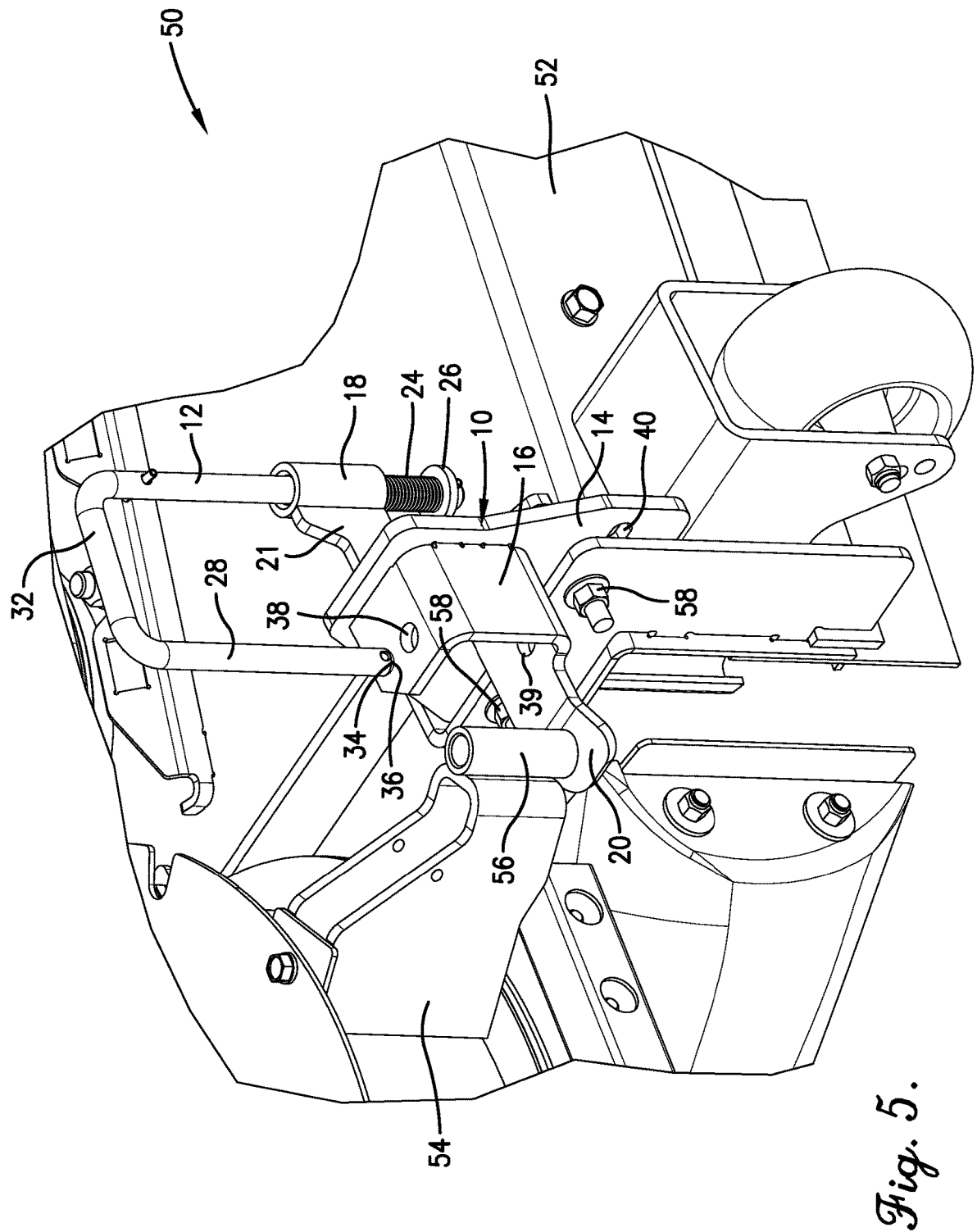
FIG. 5 is a close-up view of the mower shown in FIG. 4 showing in detail the locking bracket with the locking pin thereof in a storage position and the blower attachment in an unlocked state.

As best understood by comparing FIG. 5 to FIG. 6, the locking bracket 10 eases a process of securing the mowing attachment 54 to the main body 52 of the mower 50 as well as removing the mowing attachment 54 from the main body 52 of the mower 50. First, as seen in FIG. 5, the mowing attachment 54 is swung towards the main body 52 until the mounting boss 56 engages the guide tab 20 or other guide portion of the locking bracket 10 and, more particularly, a ramped upward facing surface of the guide tab 20. The ramped upward facing surface of the guide tab 20 directs the mounting boss 56 to a mounting location within the channel 16. More particularly, as the mowing attachment 54 is swung towards the main body 52, the mounting boss 56 engages and slides along the ramped upward facing surface of the guide tab 20 and seamlessly slides into the open interior of the channel 16. This is an improvement over known brackets that did not include such a guide tab 20 and thus in which the user had to properly align the mounting boss and lift the heavy mowing attachment into place. In other embodiments, there is no direct contact between the mounting boss 56 or other engagement portion with the guide tab 20 or other guide portion. Instead, the guide tab 20 or other guide portion guides the engagement portion into the channel 16 by contacting another portion of the attachment component and/or by serving as a visual cue towards an internal portion of the channel 16 during the mounting process.

While the mowing attachment 54 is being swung into place and thus guided into a mounting position within the channel 16 via the guide tab 20, the locking pin 12 is placed in the storage position, as shown in FIG. 5, or other unlocked position. Again, when the locking pin 12 is in the storage position, the storage hole 36 prevents the locking pin from extending down into the interior of the channel 16, and thus the pin 12 does not inhibit movement of the mounting boss 56 into or out of the channel 16. Once the mounting boos 56 is fully received within the channel 16, the through hole of the mounting boss 56 is axially aligned with the first locking hole 38 and optionally with the second locking hole 39, if so equipped. A user then lifts up on the locking pin 12 (via the handle portion 32) and rotates the pin 12 so that the first leg 28 is axially aligned with the first locking hole 38. When the locking pin 12 is thereafter released, the biasing force applied to the pin 12 via the biasing member 24 forces the pin 12 downwards with the first leg 28 extending through the first locking hole 38, the mounting boss 56, and the second locking hole 39 (when equipped). This secures the mowing attachment 54 in the mounted position (FIG. 6). Because in this position the biasing member 24 continues to exert a downward force on the locking pin 12, the pin 12 is held securely in place without requiring the insertion of a hitch pin or similar, as is required in known mounting brackets and pins.

Beneficially, the mowing attachment 54 can easily be moved between the mounted position (FIG. 6) and a removed position (FIG. 5) and back again by simply moving the locking pin 12 between the storage hole 36 and the locking hole 38 and simply sliding the mounting boss 56 away from the main body 52 and back towards the main body 52. Thus, if a user needs to access an interior of the mowing attachment 54 during use in order to, e.g., remove a clog or otherwise service the attachment 54, they can easily do so without having to worry about misplacing a locking pin and/or a hitch pin thereof. Moreover, due to the ramped upward facing surface of the guide tab 20 which beneficially guides the mounting boss 56 to the mounting location, one person can easily mount the mowing attachment 54 without requiring assistance to lift and align the attachment 54.

What is claimed is:
1. A locking bracket comprising:
a rigid body including a storage hole and a locking hole, with a diameter of the storage hole being smaller than a diameter of the locking hole; and a locking pin slidably and rotatably coupled to the rigid body and movable between an unlocked position, a storage position, and a locked position, wherein the rigid body is configured to removably receive an engagement member, wherein the locking pin is configured to permit the engagement member to enter and exit the rigid body when the locking pin is in the unlocked position, wherein an end of the locking pin is configured to lock the engagement member in the rigid body when the locking pin is in the locked position, wherein a tip comprising the end of the locking pin is configured to engage with the storage hole when the locking pin is in the storage position, thereby preventing the locking pin from extending completely through the storage hole, wherein the locking pin is configured to extend through the locking hole when the locking pin is in the locked position.

2. The locking bracket of claim 1, wherein the rigid body includes another locking hole, and wherein, when the locking pin is in the locked position, the locking pin extends through both the locking hole and the another locking hole.

3. The locking bracket of claim 1, wherein the locking pin is a U-pin including a first leg, a second leg, and a handle portion extending between the first leg and the second leg.

4. The locking bracket of claim 3, wherein the first leg is configured to selectively engage one of the storage hole and the locking hole when the U-pin is in the storage position and the locked position, respectively.

5. A locking bracket comprising:
a rigid body;
a locking pin slidably and rotatably coupled to the rigid body, the locking pin having a tip rotatable about a rotation axis between a first axial alignment with an unlocked position and a second axial alignment with a locked position, with the rotation axis, the first axial alignment and the second axial alignment being non-coaxial, and
a biasing member surrounding a portion of the locking pin and imparting a biasing force on the locking pin biasing the locking pin towards the unlocked position and the locked position,
wherein the rigid body is configured to removably receive an engagement member, wherein the locking pin is configured to permit the engagement member to enter and exit the rigid body when the locking pin is in the unlocked position,
wherein the tip of the locking pin is configured to extend at least partly into and to lock the engagement member in the rigid body when the locking pin is in the locked position.

6. A locking bracket for securing an attachment component to a main body, the locking bracket comprising:
a rigid body including a guide portion having a ramped surface; and
a locking member slidably and rotatably coupled to the rigid body, the locking member including a locking pin with a first leg that is configured to move along an axis into operative engagement with an engagement member of the attachment component,
wherein the guide portion is configured to guide the engagement member of the attachment component to a mounting position within the rigid body, the ramped surface being configured to guide the engagement member to the mounting position by slidably engaging with the engagement member to change the position of the engagement member along the axis simultaneously with changing the position of the engagement member in a direction normal to the axis,
wherein the locking member is configured to lock the engagement member in the rigid body when the engagement member is in the mounting position.

7. The locking bracket of claim 6, wherein the rigid body includes a storage hole and a locking hole, wherein the locking bracket is configured to permit the engagement member to enter and exit the rigid body when the locking pin is engaged with the storage hole, and wherein the locking pin is configured to secure the attachment component to the main body by extending through the locking hole and through the engagement member.

8. The locking bracket of claim 6, wherein the guide portion is a guide tab.

9. The locking bracket of claim 8, wherein the rigid body includes a C-shaped channel, wherein a proximal end of the guide tab is coupled to the C-shaped channel, and wherein the engagement member of the attachment component is received within the C-shaped channel when in the mounting position.

10. The locking bracket of claim 9, wherein the locking pin is a U-pin including the first leg, a second leg, and a handle portion extending between the first leg and the second leg, and wherein the first leg of the U-pin is configured to selectively engage one of a storage hole provided in an upper plate of the C-shaped channel and a locking hole provided in the upper plate of the C-shaped channel when the U-pin is in a storage position and a locked position, respectively.

11. A method of attaching an attachment component to a main body, the method comprising:
(a) swinging the attachment component towards the main body until an engagement member of the attachment component engages a bracket coupled to the main body;
(b) removing a tip of a locking pin of the bracket from a first axial alignment with an unlocked position, the removal of the tip including overcoming a force biasing the locking pin toward the unlocked position, the force being imparted on the locking pin by a biasing member;
(c) rotating the tip about a rotation axis into a second axial alignment with a locked position, the rotation axis, the first axial alignment and the second axial alignment being non-coaxial; and
(d) locking the attachment component to the bracket by placing the locking pin in the locked position, the locking pin being biased toward the locked position by the biasing member and the tip of the locking pin extending at least partly into the engagement member to lock the attachment component to the bracket.

12. The method of claim 11, further comprising:
(e) removing the locking pin from the locked position;
(f) placing the locking pin in the unlocked position; and
(g) swinging the attachment component away from the main body until the engagement member separates from the bracket thereby permitting access to an interior of the attachment component.

13. The method of claim 11, wherein the attachment component is a grass catcher, and wherein the main body is a lawn mower.

14. The method of claim 11, wherein the locking pin is a U-pin including a first leg, a second leg, and a handle portion extending between the first leg and the second leg, and wherein the U-pin is moved between the unlocked position and the locked position via the handle portion.

15. The method of claim 11, wherein the biasing member is compressed a first amount when the locking pin is in the unlocked position and a second amount when the locking pin is in the locked position, with the first amount being greater than the second amount.

\* \* \* \* \*